(12) United States Patent
Nelson et al.

(10) Patent No.: US 11,110,692 B2
(45) Date of Patent: Sep. 7, 2021

(54) BRAZE MATERIAL FOR CERAMIC MATRIX COMPOSITE ARTICLES

(71) Applicant: Rolls-Royce Corporation, Indianapolis, IN (US)

(72) Inventors: Scott Nelson, Carmel, IN (US); Raymond Ruiwen Xu, Carmel, IN (US); Sean E. Landwehr, Avon, IN (US); Daniel Kent Vetters, Indianapolis, IN (US); Samantha Tatar, Rockford, IL (US)

(73) Assignee: Rolls-Royce Corporation, Indianapolis, IN (US)

( * ) Notice: Subject to any disclaimer, the term of this patent is extended or adjusted under 35 U.S.C. 154(b) by 252 days.

(21) Appl. No.: 16/137,897

(22) Filed: Sep. 21, 2018

(65) Prior Publication Data

US 2019/0100467 A1 Apr. 4, 2019

Related U.S. Application Data

(60) Provisional application No. 62/567,594, filed on Oct. 3, 2017.

(51) Int. Cl.
| | |
|---|---|
| *B32B 27/20* | (2006.01) |
| *C08K 3/14* | (2006.01) |
| *C08K 3/34* | (2006.01) |
| *F01D 5/28* | (2006.01) |

(52) U.S. Cl.
CPC ............... *B32B 27/20* (2013.01); *C08K 3/14* (2013.01); *C08K 3/34* (2013.01); *F01D 5/288* (2013.01); *C08K 2201/005* (2013.01); *C08L 2666/44* (2013.01); *C08L 2666/54* (2013.01); *Y10T 428/25* (2015.01)

(58) Field of Classification Search
None
See application file for complete search history.

(56) References Cited

U.S. PATENT DOCUMENTS

| | | | |
|---|---|---|---|
| 4,961,529 A | 10/1990 | Gottselig et al. | |
| 5,336,350 A | 8/1994 | Singh | |
| 5,666,643 A | 9/1997 | Chesnes et al. | |
| 5,836,505 A | 11/1998 | Chaumat et al. | |
| 5,922,628 A * | 7/1999 | Barton | C04B 37/006 501/52 |
| 5,975,407 A | 11/1999 | Gasse et al. | |
| 6,649,682 B1 * | 11/2003 | Breton | C09D 7/61 524/404 |
| 6,991,856 B2 | 1/2006 | Weihs et al. | |

(Continued)

FOREIGN PATENT DOCUMENTS

| | | |
|---|---|---|
| WO | 2011029785 A1 | 3/2011 |
| WO | 2011113760 A1 | 9/2011 |
| WO | 2014013166 A1 | 1/2014 |

*Primary Examiner* — Satya B Sastri
(74) *Attorney, Agent, or Firm* — Shumaker & Sieffert, P.A.

(57) ABSTRACT

In some examples, a braze material includes a first set of particles, a second set of particles, and a polymeric binder. The first set of particles includes a braze powder, where the braze powder comprises an Si-containing alloy. The first set of particles defines an average or median particle diameter between about 1 μm and about 40 μm. The second set of particles includes at least one of SiC or a transition metal carbide, where the second set of particles has a multimodal particle size distribution.

20 Claims, 5 Drawing Sheets

(56) References Cited

U.S. PATENT DOCUMENTS

| | | | |
|---|---|---|---|
| 7,318,547 B2 | 1/2008 | Gasse | |
| 7,946,467 B2 | 5/2011 | Cretegny | |
| 8,763,883 B2 | 7/2014 | Chaumat et al. | |
| 8,974,891 B2 | 3/2015 | Riedell | |
| 9,056,369 B2 | 6/2015 | Chaumat et al. | |
| 9,403,240 B2 | 8/2016 | Revel et al. | |
| 2003/0102071 A1* | 6/2003 | Mako | C04B 35/565 |
| | | | 156/89.11 |
| 2010/0075160 A1 | 3/2010 | Chaumat et al. | |
| 2011/0033717 A1 | 2/2011 | Peterson et al. | |
| 2012/0177488 A1 | 7/2012 | Corman | |
| 2013/0075039 A1 | 3/2013 | Herderick et al. | |
| 2016/0083305 A1* | 3/2016 | Goetz | C04B 41/5096 |
| | | | 501/88 |
| 2016/0207129 A1 | 7/2016 | Ritchey et al. | |
| 2016/0244374 A1* | 8/2016 | Nelson | C04B 37/006 |
| 2016/0325368 A1 | 11/2016 | Landwehr et al. | |

\* cited by examiner

BRAZE MATERIAL FOR CERAMIC MATRIX COMPOSITE ARTICLES

This application claims priority to U.S. Provisional Patent Application No. 62/567,594, filed Oct. 3, 2017, the entire contents of which are incorporated herein by reference.

TECHNICAL FIELD

The present disclosure relates to a braze material for ceramic matrix composite articles.

BACKGROUND

Ceramic matrix composite (CMC) articles may be useful in a variety of contexts where mechanical and thermal properties are important, such as, for example, components in high-temperature mechanical systems, including gas turbine engines. In some examples, a CMC article may become damaged during use, such as, due to minor overstressing, impact, or the like. In some such examples, the CMC article may be repaired to restore the CMC article to its original dimensions and/or functionality, e.g., the original dimensions and/or functionality of the CMC article prior to becoming damaged.

SUMMARY

In some examples, a braze material includes a first set of particles, a second set of particles, and a polymeric binder. The first set of particles includes a braze powder, where the braze powder comprises an Si-containing alloy. The first set of particles defines a median particle diameter between about 1 μm and about 40 μm. The second set of particles includes at least one of SiC or a transition metal carbide, where the second set of particles has a multimodal particle size distribution.

In some examples, a method of repairing a ceramic matrix composite component includes removing a damaged portion of a ceramic matrix composite component to define a repair surface and applying a braze material to the repair surface. The braze material includes a first set of particles, a second set of particles, and a polymeric binder. The first set of particles includes a braze powder, where the braze powder comprises an Si-containing alloy. The first set of particles defines a median particle diameter between about 1 μm and about 40 μm. The second set of particles includes at least one of SiC or a transition metal carbide, where the second set of particles has a multimodal particle size distribution. The method further includes heating the ceramic matrix composite component and the braze material to form a repaired article.

In some examples, an assembly includes a ceramic matrix composite component defining a repair surface and a braze material on the repair surface. The braze material includes a first set of particles, a second set of particles, and a polymeric binder. The first set of particles includes a braze powder, where the braze powder comprises an Si-containing alloy. The first set of particles defines a median particle diameter between about 1 μm and about 40 μm. The second set of particles includes at least one of SiC or a transition metal carbide, where the second set of particles has a multimodal particle size distribution.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
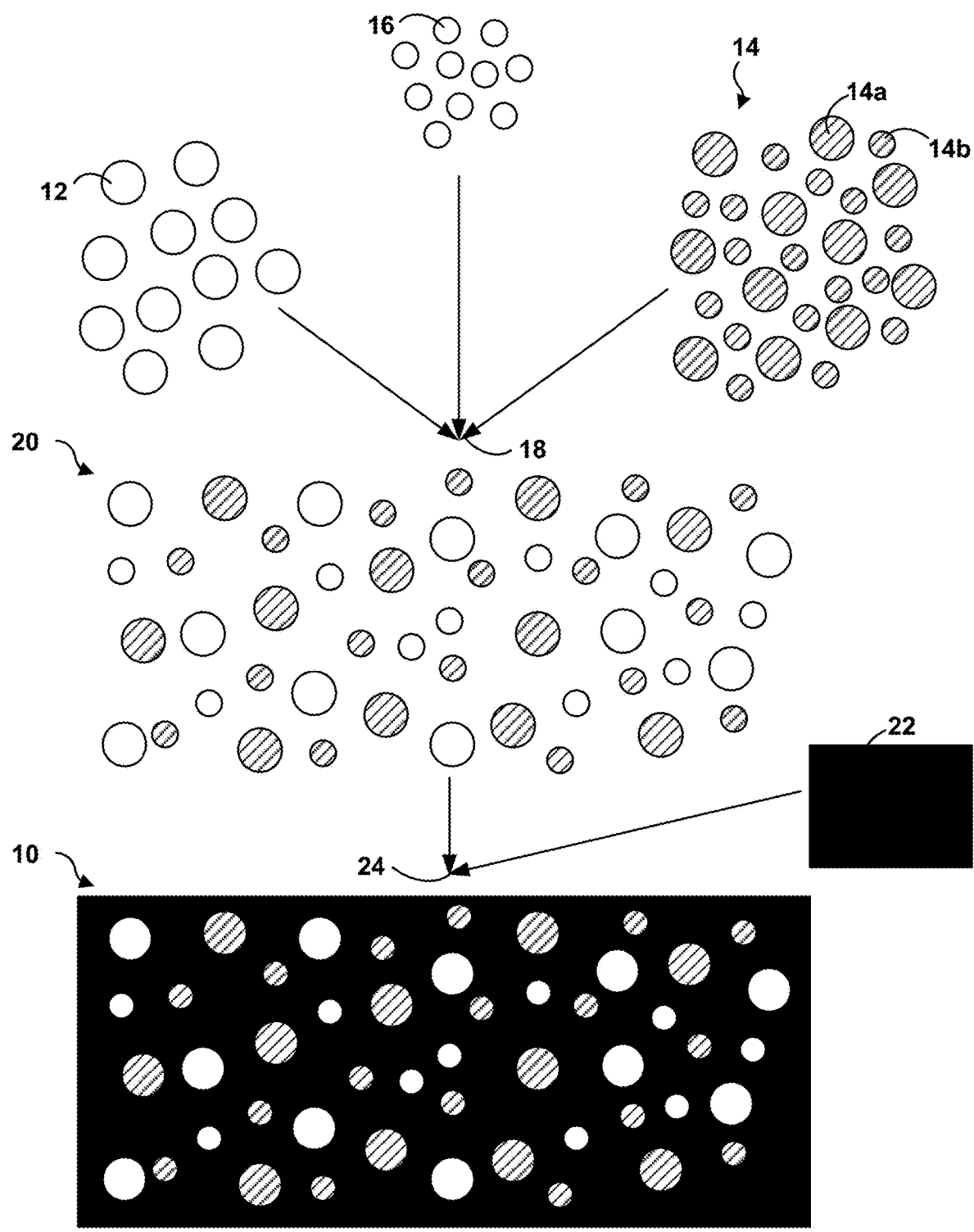
FIG. 1 is a conceptual diagram illustrating an example braze material and example constituents of the braze material.

The disclosure describes a braze material for the repair of a ceramic matrix composite (CMC) article. The braze material may include a first set of particles including a braze powder, a second set of particles including at least one of SiC or a transition metal carbide, an optional third set of particles including an additive, and a polymeric binder. The braze powder in the first set of particles may include a Si-containing alloy, and the first set of particles may define an average or median particle diameter between about 1 μm and about 40 μm. The second set of particles may have a multimodal particle size distribution. By including a multimodal particle size distribution of the second set of particles and the relatively small average or median particle diameter of the first set of particles, the resulting material may mix more uniformly, which may result in a more uniform final material formed from the braze material.

A CMC article may include a matrix material and a reinforcement material. The reinforcement material may enhance the properties of the matrix material, e.g., may contribute tensile strength to the CMC. In some examples, the CMC article may become damaged during use or during manufacture. A damaged CMC article may include, for example, shear cracks or fissures, delamination, matrix splitting, apertures resulting from incomplete matrix material infiltration, debonding of the reinforcement and the matrix material, or the like. For example, the CMC article may develop cracks or fissures after contacting another part in a gas turbine engine, or may develop cracks or fissures following contact with debris or hot gases in a fluid stream of a gas turbine engine. As another example, the CMC article may have been incompletely melt infiltrated during manufacture, resulting in apertures and/or cracks remaining in the CMC article.

The braze material described herein may be used to repair a CMC article. In some such examples, the CMC article may be repaired after manufacturing of the CMC article has been completed. Repair techniques including the use of the braze material described herein may subject the CMC article to lower temperatures than some other repair techniques that do not include the use of the braze material described herein. The braze material may further provide the repaired CMC article with an integrated matrix-like CMC material similar to the composition of the CMC article itself due to the including a second set of particles including SiC. Further, due to the multimodal particle size distribution of the second set of particles and the relatively small average or median particle diameter of the first set of particles, the resulting material may mix more uniformly, which may result in a more uniform final material formed from the braze material. In turn, the repaired CMC article and/or the repaired portion of the CMC article may exhibit similar mechanical and/or thermal properties as the original CMC article, which may allow the repaired CMC article to perform the same as or similar to the CMC article performed prior to being damaged, e.g., having similar dimensions and/or material properties as the CMC article prior to the damage.

FIG. 1 is a conceptual diagram illustrating an example braze material 10 and the constituents of braze material 10. Braze material 10 may include a first set of particles 12, a second set of particles 14, an optional third set of particles 16, and a polymeric binder 22.

First set of particles 12 includes a braze powder. The braze powder of first set of particles 12 may include a Si-containing alloy. For example, the braze powder may include at least one of a Si—Ti alloy, a Si—Al—Ti alloy, a Si—Co—V—Ti alloy, or a Si—Ti—Ni—Co—Cr alloy. In some examples, first set of particles 12 may define particle diameter between about 1 µm and about 40 µm, such as between about 25 µm and about 40 µm. In some such examples, first set of particles 12 defining an average or median particle diameter between about 1 µm and about 40 µm may allow first set of particles 12 to be substantially evenly distributed throughout braze material 10 such that first set of particles 12 is relatively uniformly intermixed with second set of particles 14 and/or optional third set of particles 16. In this way, braze material 10 may have a relatively uniform distribution of particles and/or phases of at least first set of particles 12 and second set of particles 14, in comparison to some braze materials that include a first set of particles that define a larger average or median particle diameter.

In some examples, first set of particles 12 may have a specific particle size distribution. For example, first set of particles 12 may include particles all having substantially the same average or median particle diameter, e.g., a unimodal distribution of average or median particle diameters; a distribution of average or median particle diameters, e.g., a bell curve of average or median particle diameters; a multimodal distribution of average or median particle diameters; or the like. In some examples, a multimodal particle size distribution may allow for better mixing and/or packing of first set of particles 12 throughout braze material 10, whereas particles all having substantially the same average or median particle diameter may result in less preprocessing of first set of particles 12 prior to forming braze material 10. First set of particles 12 may have any particle size distribution to fit particular needs of braze material 10.

Braze material 10 may also include second set of particles 14. Second set of particles 14 may include at least one of SiC or a transition metal carbide (e.g., TiC, ZrC, VC, NbC, TaC, $Cr_3C_2$, or $Mo_2C$). In some examples, second set of particles 14 has a multimodal particle size distribution. As used herein, a "multimodal particle size distribution" describes a particle size distribution that includes two or more peaks. In other words, second set of particles 14 may include two or more subsets of particles, each subset of particles defining a different average or median particle diameter. For example, second set of particles 14 may have a bimodal particle size distribution, and may include a first subset of particles 14a that defines a first average or median particle diameter and a second subset of particles 14b that defines a second average or median particle diameter. As shown in FIG. 1, first subset of particles 14a may define a larger average or median particle diameter than second subset of particles 14b. In some examples, first subset of particles 14a and second subset of particles 14b may each define an average or median particle diameter between about 0.3 µm and about 45 µm. In one example, first subset of particles 14a may have an average or median particle diameter of about 0.3 µm and second subset of particles 14b may have an average or median particle diameter of about 40 µm.

In some examples, second set of particles 14 having a multimodal distribution may allow for better mixing or packing of second set of particles 14 throughout braze material 10 and/or with other sets of particles. For example, first subset of particles 14a and second subset of particles 14b may be able to fill more open space between other particles, e.g., first set of particles 12 or optional third set of particles 16, within braze material 10 in comparison to a second set of particles that does not have a multimodal particle size distribution. In turn, second set of particles 14 may be substantially evenly distributed throughout braze material 10 in comparison to second set of particles 14 including a unimodal distribution of particle size. The more even distribution of second set of particles 14 throughout braze material 10 may result in a more uniform final material formed from braze material 10. Additionally, or alternatively, second set of particles 14 that have a multimodal size distribution may allow a CMC article repaired using braze material 10 to include a matrix-like SiC structure in the repaired portion similar to the underlying CMC article without the use of a high-temperature slurry or melt infiltration process that may damage the underlying CMC article.

In some examples, braze material 10 may include an optional third set of particles 16. The optional third set of particles 16 may include an additive. The additive may include, for example, at least one of C, Si metal, a silicide, or a carbide. Examples of an additive including a silicide may include a transition metal silicide such as $MoSi_2$, $TiSi_2$, $ZrSi_2$, $WSi_2$, or combinations thereof. Examples of an additive including a carbide may include a transition metal carbide such as TiC, ZrC, VC, NbC, TaC, $Cr_3C_2$, $Mo_2C$, or combinations thereof. In examples in which third set of particles 16 includes a carbide, the carbide may facilitate SiC infiltration into small openings, such as, for example, between other particles and/or on a repair surface of the CMC article to be repaired. In some examples, an additive including C may include graphite, carbon black, diamond, or the like.

Optional third set of particles 16 may additionally or alternatively include an additive that increases the wettability of braze material 10. As used herein, "wettability" describes the tendency of a fluid to spread on, adhere to, and/or maintain contact with a solid surface, such as a repair surface of a CMC article to be repaired. In some examples, an additive that increases the wettability of braze material may include a carbonaceous material. In some examples, the carbonaceous material may include a carbon precursor resin, such as phenolic resin, for example, or a boron-containing carbonaceous material.

In some examples, third set of particles 16 may react with at least some of the first set of particles 12 during the brazing process to form SiC. In one example, silicon from first set of particles 12 may react with carbon from optional third set of particles 16 to form SiC. In some examples, optional third set of particles 16 including one of C or a carbide and one of Si metal or a silicide may react with each other in addition, or alternatively, to reacting with first set of particles 12.

First set of particles 12, second set of particles 14, and optional third set of particles 16 may be mixed 18 to form particle mixture 20. In some examples, first set of particles 12, second set of particles 14, and/or third set of particles 16 may be milled, sorted, filtered, and/or otherwise preprocessed prior to being mixed 18. For example, first set of particles 12 may be milled prior to being mixed 18 to define an average or median particle diameter between about 1 μm and about 40 μm. In another example, second set of particles 14 may be sorted and/or filtered, e.g., using a sieve or a screen, to have a multimodal particle size distribution, such as first subset of particles 14a and second subset of particles 14b. In some examples, after mixing 18, at least first set of particles 12 and second set of particles 14 may be substantially evenly distributed throughout particle mixture 20. In other examples, additional mixing and/or components may be added to particle mixture 20 so that at least first set of particles 12 and second set of particles 14 are substantially evenly distributed throughout braze material 10.

Particle mixture 20 may be mixed 24 with polymeric binder 22 to form braze material 10. In some examples, polymeric binder 22 may include a polysaccharide such as, for example, methyl cellulose, carboxymethyl cellulose, hydroxypropyl methyl cellulose, gellan gum, xanthan gum, agarose, carrageenan, or combinations thereof. Additionally, or alternatively, polymeric binder 22 may include a monomeric pre-gellant material such as acrylamides, acrylates, vinyls, allyls, or combinations thereof. In some examples, polymeric binder 22 may optionally further include a gelation initiator, a gelation promoter, and/or a polymerization initiator to aid gelation of the pre-gellant material. The gelation initiator or gelation promoter, in some examples, may include a monovalent or a divalent salt, and the polymerization initiator may include a peroxide, a persulfate, a perchlorate, an amine, an azo compound, or combinations thereof.

In some examples, polymeric binder 22 may include a dispersant, such as, for example, polyethylenimine, polyvinylpyrrolidone, or the like. In some such examples, the dispersant may help substantially evenly distribute first set of particles 12, second set of particles 14, and/or third set of particles 16 throughout braze material 10 to form a homogeneous or substantially homogeneous mixture of first set of particles 12, second set of particles 14, optional third set of particles 16, and/or polymeric binder 22.

Braze material 10 may include between about 40 weight % and about 60 weight % of first set of particles 12, between about 40 weight % and about 60 weight % of second set of particles 14, and between about 5 weight % and about 20 weight % of polymeric binder 22. In examples in which braze material 10 includes optional third set of particles 16, braze material 10 may include between about 40 weight % and about 60 weight % of first set of particles 12, between about 40 weight % and about 60 weight % of second set of particles 14, between about 5 weight % and about 25 weight % of optional third set of particles 16, and between about 5 weight % and about 20 weight % of polymeric binder 22. In some examples, braze material 10 may include about 40 weight % to about 60 weight % of second set of particles 14 relative to first set of particles 12 to substantially evenly distribute first set of particles 12 throughout braze material 10.

Braze material 10 may be in various forms. For example, braze material 10 may be in the form of a tape, a slurry, a paste, or a pre-sintered preform. In some examples, polymeric binder 22 used to form braze material 10 may depend on the final desired form of braze material 10. For example, polymeric binder 22 with a lower viscosity may be used to create braze material 10 in the form of a paste in comparison to polymeric binder 22 used to create braze material 10 in the form of a tape. In some examples, the form of braze material 10, e.g., a tape, a slurry, a paste, or a pre-sintered preform, may be chosen based on the type of repair, the location of the repair, properties of the damaged CMC article to be repaired, or the like.

In examples in which braze material 10 is in the form of a slurry, the slurry may include braze material 10 disposed in a solvent. For example, the slurry may include braze material 10, an optional gelation initiator, gelation promoter, and/or polymerization initiator, optional additives, and a solvent. The solvent may be selected to disperse or dissolve polymeric binder 22 and the optional gelation initiator, gelation promoter, and/or polymerization initiator. In some examples, the solvent is aqueous (includes a major amount of water), or is water. Other solvents that can be used in the slurry include alcohols. In some examples, the slurry may optionally include less than about 10 weight percent (wt. %) of additives such as, for example, dispersants, surfactants, pH adjustors, and the like.

In examples in which braze material 10 is in the form of a tape, the tape may be formed from a slurry, such as the slurry described above, and dried in a furnace. In an example, one or more rollers may rotate to move a belt in a clockwise direction under a reservoir to receive the slurry including braze material 10. The thickness of the slurry on the belt may defined by a wall, an opening used to deposit the slurry on the belt, or the like. The slurry may be carried by the belt through a furnace, which dries the slurry. In some examples, heat from the furnace may also facilitate a gelation reaction of polymeric binder 22 in braze material 10 to form a tape. Due to the presence of polymeric binder 22, the tape may be at least somewhat flexible. In examples in which braze material 10 is formed into a pre-sintered preform, a similar process as that used to form the tape may be used to form braze material 10 as a pre-sintered preform. The pre-sintered preform may define a geometry substantially matching a geometry of a repair portion of the article being repaired using the pre-sintered preform.

In some examples, braze material 10 may be formed with selected properties depending on the use of braze material 10. For example, a braze material 10 used to repair a superficially damaged CMC article may be different than a braze material 10 used to repair a non-superficially damaged CMC article. As used herein, a "superficially damaged CMC article" has a defect or damage on a surface of the CMC article that does not extend into the fibers of the CMC article, whereas a "non-superficially damaged CMC article" has a defect or damage that extends into the fibers and/or reinforcement material of the CMC article. In some examples, braze material 10 used to repair a superficially damaged CMC article may include a different multimodal distribution of second set of particles 14, a different second set of particles 14 including SiC, different average or median particle diameters, or the like, in comparison to braze material 10 used to repair a non-superficially damaged CMC article. For example, braze material 10 used to repair a superficially damaged CMC article may include a bimodal distribution of second set of particles 14 and/or a larger average or median particle diameter than braze material 10 used to repair a non-superficially damaged CMC article.

Braze material may further provide a repaired CMC article with an integrated matrix-like CMC material similar to the composition of the CMC article itself due to the including second set of particles 14 that includes at least one of SiC or a transition metal carbide. Further, due to the multimodal particle size distribution of second set of particles 14 and the relatively small average or median particle diameter of first set of particles 12, braze material 10 may mix more uniformly, which may result in a more uniform final material formed from braze material 10. In turn, the repaired CMC article and/or the repaired portion of the CMC article may exhibit similar mechanical and/or thermal properties as the original CMC article, which may allow the repaired CMC article to perform the same as or similar to the CMC article performed prior to being damaged, e.g., having similar dimensions and/or material properties as the CMC article prior to the damage.

Figure 2:
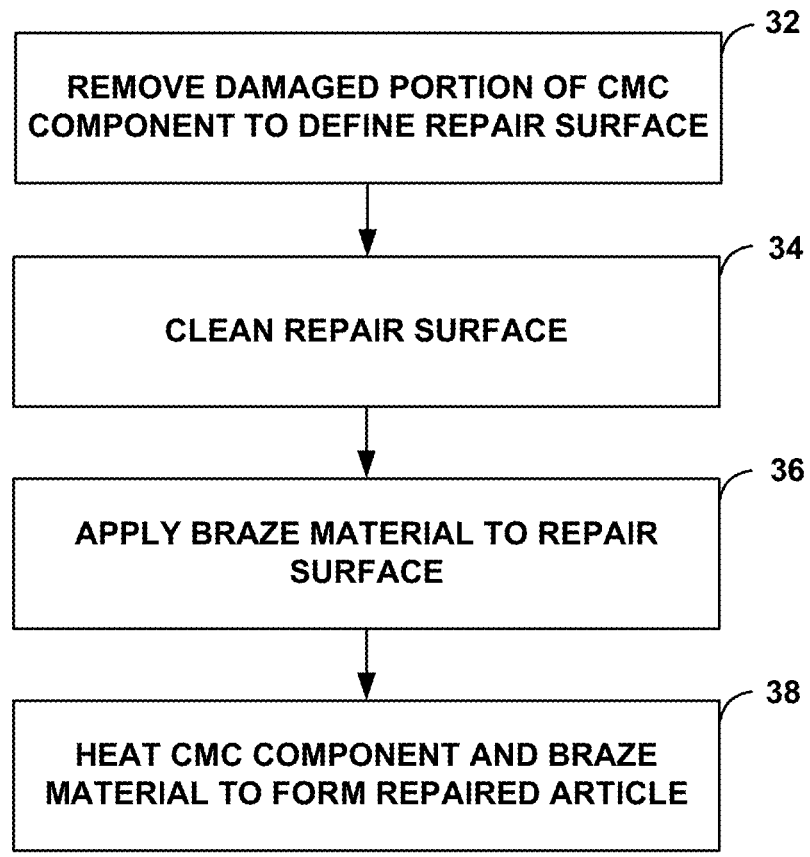
FIG. 2 is a flow diagram illustrating an example technique for repairing a ceramic matrix composite article using a braze material.

Braze material 10 may be used to repair a damaged article that includes a ceramic or ceramic matrix composite. FIG. 2 is a flow diagram illustrating an example technique for repairing a ceramic matrix composite article 40 using braze material 10. FIGS. 3A-3D are conceptual diagrams illustrating stages of the technique of FIG. 2. The technique of FIG. 2 will be described with respect to braze material 10 of FIG. 1 and the stages of CMC article 40 and 48 illustrated in FIGS. 3A-3D for ease of description only; in other examples, other stages may be used with the technique of FIG. 2.

Figure 3A:
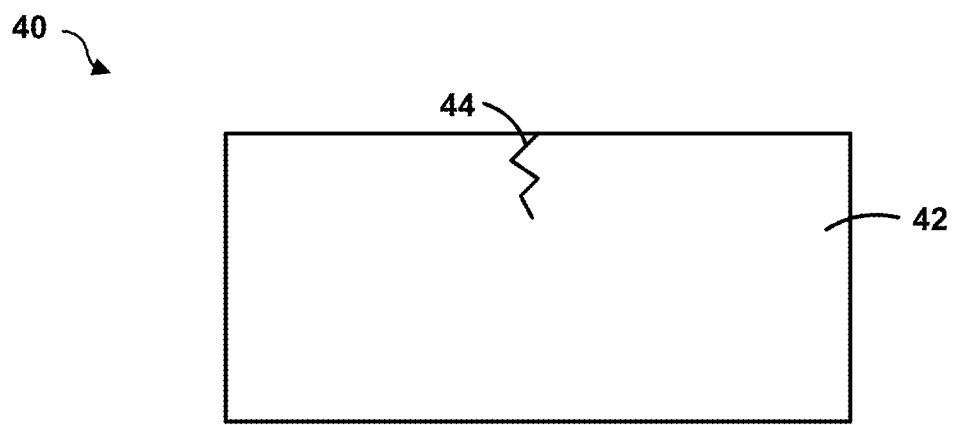
FIGS. 3A-3D are conceptual diagrams illustrating stages of the example technique of FIG. 2 for repairing a ceramic matrix composite article using a braze material.
Figure 3B:
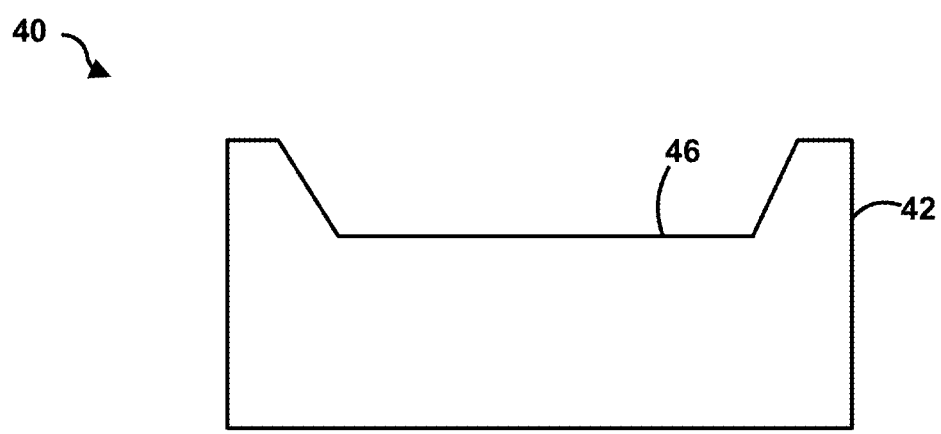
Figure 3C:
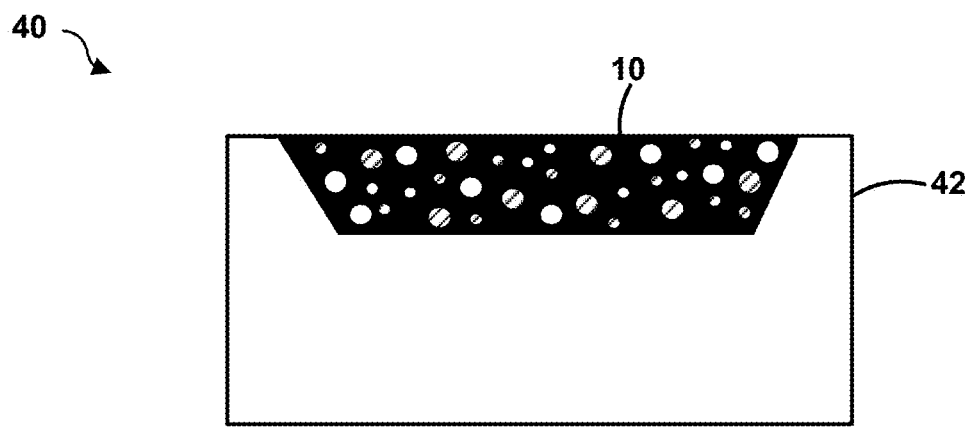
Figure 3D:
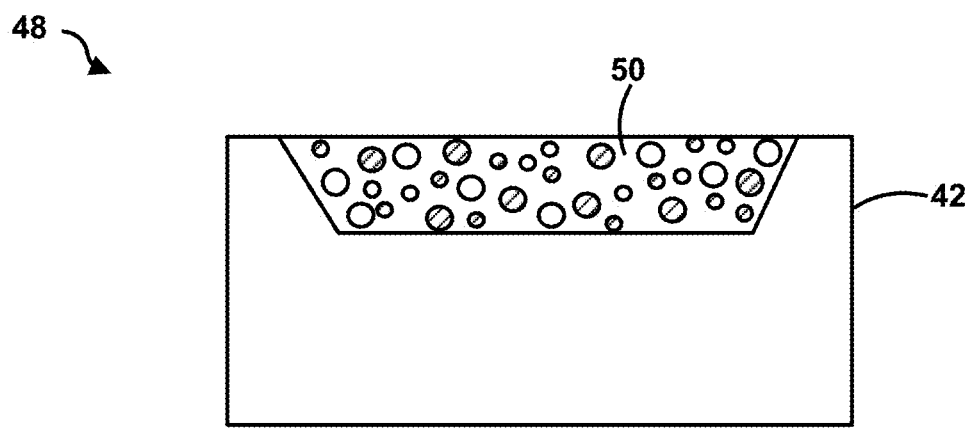

FIG. 3A shows a CMC article 40 including a CMC component 42 and a damaged portion 44. CMC component 42 may include a matrix material and a reinforcement material (not shown). The matrix material may include, for example, silicon metal or a ceramic material, such as silicon carbide (SiC), silicon nitride ($Si_3N_4$), an aluminosilicate, silica ($SiO_2$), a transition metal carbide or silicide (e.g., WC, $Mo_2C$, TiC, $MoSi_2$, $NbSi_2$, $TiSi_2$), or the like.

The reinforcement material may include a continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave. In some examples, the reinforcement material may include carbon (C), silicon carbide (SiC), silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), or the like.

In some examples, the composition of the reinforcement material is the same as the composition of the matrix material. For example, a matrix material including silicon carbide may surround a reinforcement material including silicon carbide whiskers. In other examples, the reinforcement material includes a different composition than the composition of the matrix material, such as aluminosilicate fibers in an alumina matrix, or the like. One composition of CMC component 42 may be a reinforcement material of silicon carbide continuous fibers embedded in a matrix material of silicon carbide. In some examples, CMC component 42 includes a SiC-SiC CMC.

Damaged portion 44 may have formed in CMC component 42 during use or during manufacture. Damaged portion 44 may include, for example, shear cracks or fissures, delamination, matrix splitting, apertures resulting from incomplete matrix material infiltration, debonding of the reinforcement and the matrix material, or the like. For example, CMC component 42 may have developed damaged portion 44 after contacting another part in a gas turbine engine, or following contact with debris or hot gases in a fluid stream of a gas turbine engine. As another example, CMC component 42 may have been incompletely melt infiltrated during manufacture, resulting in damaged portion 44.

The technique of FIG. 2 includes removing damaged portion 44 of CMC component 42 to define a repair surface 46 (32). Damaged portion 44 may be removed to define repair surface 46 in any applicable manner, such as, for example, by drilling, surface grinding, etching, or the like. Repair surface 46 may be any size or shape that completely removes damaged portion 44 from CMC component 42 and defines a suitable geometry for binding to braze material 10.

In some examples, the technique of FIG. 2 optionally includes cleaning repair surface 46 (34). For example, repair surface 46 may be cleaned using a solvent, a chemical, an ultrasonic bath, or the like.

The technique of FIG. 2 further includes applying braze material 10 to repair surface 46 (36). Braze material 10 may be applied in any suitable form, such as, for example, in the form of a slurry, a tape, a pre-sintered preform, a paste, or the like. In some examples, braze material 10 may be applied such that all of repair surface 46 is covered by braze material 10, which may help restore the final repaired CMC component to the original dimensions and/or functionality of the CMC component prior to becoming damaged. The method of application of braze material 10 to repair surface 46 may differ depending on the form of braze material 10. For example, a braze material 10 that is a tape or pre-sintered preform may be placed or otherwise positioned against repair surface 46. As another example, a braze material 10 that is a slurry or a paste may be spread, sprayed, or otherwise introduced to a volume adjacent to repair surface 46.

After application of braze material 10 to repair surface 46 (36), the technique of FIG. 2 includes heating CMC component 42 and braze material 10 to form repaired article 48 (38). In some examples, CMC component 42 and braze material 10 may be placed into a vacuum furnace and heated in a partial pressure inert gas atmosphere, e.g., a partial pressure Ar atmosphere. In some examples, CMC component 42 and braze material 10 may be heated at a temperature about 10° C. (about 50° F.) to about 20° C. (about 100° F.) above the liquidus temperature of first set of particles 12 in braze material 10. As used herein, "liquidus temperature" describes a temperature that above which a material is completely liquid. In some examples, braze material 10 including a greater amount of second set of particles 14 including SiC may be heated to a higher temperature, e.g., closer to about 20° C. (about 100° F.) above the liquidus temperature of first set of particles 12, than some braze material 10 including lesser amounts of SiC.

In some examples, a temperature of about 10° C. (about 50° F.) to about 20° C. (about 100° F.) above the liquidus temperature of first set of particles 12 in braze material 10 may be less than some metal melt infiltration temperatures. In this way, the technique of FIG. 2 may be less likely to damage CMC component 42 during heating than some other repair techniques, such as those including metal melt infiltration. CMC component 42 and braze material 10 may be heated at a temperature about 10° C. (about 50° F.) to about 20° C. (about 100° F.) above the liquidus temperature of first set of particles 12 for about 15 minutes to about 1 hour.

Due to heating at a temperature of about 10° C. (about 50° F.) to about 20° C. (about 100° F.) above the liquidus temperature of first set of particles 12, first set of particles 12 at least partially melts during heating. In some examples, some sets of particles may melt in addition to first set of particles 12, while other sets of particles may not melt. In this way, braze material 10 may include both melted and non-melted components when heated to a temperature about 10° C. (about 50° F.) to about 20° C. (about 100° F.) above the liquidus temperature of first set of particles 12. In addition, in some examples, polymeric binder 22 of braze material 10 may evaporate or burn off.

In some examples, during the heating, first set of particles 12 including at least one of a Si—Ti alloy, a Si—Al—Ti alloy, a Si—Co—V—Ti alloy, or a Si—Ti—Ni—Co—Cr alloy may react with optional third set of particles 16 including carbon to form SiC. In some examples, optional third set of particles 16 may include C or a carbide and Si metal or a silicide, and the C or carbide may react with the Si metal or silicide in addition, or alternatively, to reacting with first set of particles 12. In some examples, the heating also may cause reactions between braze material 10 and repair surface 46 of CMC component 42, which may form a relatively strong bond between final braze material 50 and CMC component 42.

In some examples, final braze material 50 may have a composition including about 20 weight % to about 60 weight % of SiC. For example, final braze material 50 may include between about 20 weight % and about 60 weight % of SiC, such as from second set of particles 14, reactions between any of the sets of particles 12, 14, and/or 16 that formed SiC, or the like. In this way, repaired article 48 may include a matrix-like SiC structure in final braze material 50 similar to the underlying CMC component 42 without the use of a high-temperature slurry or melt infiltration process that may damage CMC component 42.

In some examples, final braze material 50 may include more than one phase. For example, final braze material 50 may include a phase of SiC and a phase including Si, Ti, silicides, or the like. In other examples, final braze material 50 may include one or more additional or alternative phases. In some examples, final braze material 50 may include a greater volume percentage of the SiC phase than any of the other phases. Including a greater volume percentage of the SiC phase than any of the other phases may result in final braze material 50 that is more similar to the underlying CMC component 42. In turn, final braze material 50 may restore the underlying CMC component 42 to the functionality of the original CMC component (e.g., functionality of the CMC component prior to CMC component 42 becoming damaged).

Examples

Figure 4:
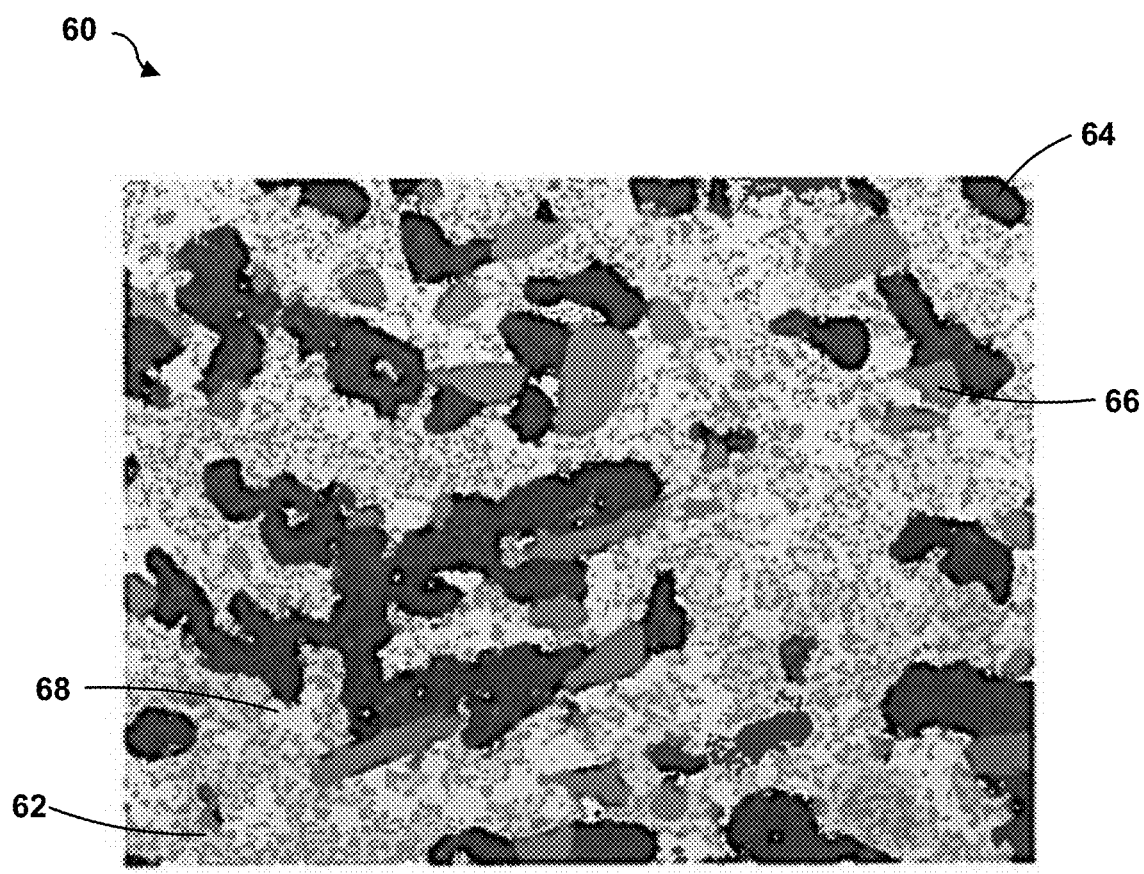
FIG. 4 is a cross-sectional micrograph of an example repair volume formed using a braze material according to examples of this disclosure.

A braze powder including a silicon-titanium alloy was mixed with a SiC reinforcement material and a polymer binder to form the braze material. The SiC reinforcement material included SiC particles, and had a bimodal particle size distribution including a first subset of particles having an average particle diameter of about 0.3 µm and a second subset of particles having an average particle diameter of about 40 µm. The braze material included 40 weight % of the SiC reinforcement material, with about 66 weight % of the SiC reinforcement material being the first subset of particles having an average particle diameter of about 0.3 µm and about 33 weight % of the SiC reinforcement material being the second subset of particles having an average particle diameter of about 40 µm. The braze material was applied to a CMC substrate including SiC fibers and a Si—SiC matrix. The CMC substrate and braze material was heated at a temperature of about 1375° F. for about 30 minutes. The heating was performed in an inert argon atmosphere. FIG. 4 is a cross-sectional micrograph of the resulting repair volume 60. As shown in FIG. 4, the resulting repair volume 60 included SiC reinforcement material 66 dispersed throughout the matrix material 62 and titanium silicide 68 of repair volume 60 and some residual porosity 64.

Various examples have been described. These and other examples are within the scope of the following claims.

What is claimed is:

1. A braze material comprising:
a first set of particles comprising a braze powder, wherein the braze powder comprises an Si-containing alloy, and wherein the first set of particles defines a median particle diameter between about 1 µm and about 40 µm;
a second set of particles comprising at least one of SiC or a transition metal carbide, wherein the second set of particles has a multimodal particle size distribution; and
a polymeric binder.

2. The braze material of claim 1, wherein the second set of particles has a bimodal particle size distribution.

3. The braze material of claim 1, wherein the first set of particles defines a median particle diameter between about 25 µm and about 40 µm.

4. The braze material of claim 1, further comprising an additive comprising at least one of C, Si metal, a silicide, or a carbide.

5. The braze material of claim 1, wherein the Si-containing alloy comprises at least one of a Si—Ti alloy, a Si—Al—Ti alloy, a Si—Co—V—Ti alloy, or a Si—Ti—Ni—Co—Cr alloy.

6. The braze material of claim 1, wherein each particle size distribution of the multimodal particle size distribution of the second set of particles defines a median particle size between about 0.3 µm and about 45 µm.

7. The braze material of claim 1, wherein the braze material comprises between about 40 weight % and about 60 weight % of the first set of particles, between about 40 weight % and about 60 weight % of the second set of particles, and between about 5 weight % and about 20 weight % of the polymeric binder, with a total of 100 weight %.

8. The braze material of claim 1, wherein the polymeric binder comprises a dispersant.

9. The braze material of claim 1, wherein the first set of particles and the second set of particles are each substantially evenly distributed throughout the braze material.

10. The braze material of claim 1, wherein the braze material comprises one of a tape, a slurry, a paste, and a pre-sintered preform.

11. A method of repairing a ceramic matrix composite component comprising:
removing a damaged portion of a ceramic matrix composite component to define a repair surface;
applying a braze material to the repair surface, wherein the braze material comprises:
a first set of particles comprising a braze powder, wherein the braze power comprises a Si-containing alloy, and wherein the first set of particles defines a median particle diameter between about 1 µm and about 40 µm;
a second set of particles comprising at least one of SiC or a transition metal carbide, wherein the second set of particles has a multimodal particle size distribution; and
a polymeric binder; and
heating the ceramic matrix composite component and the braze material to form a repaired article.

12. The method of claim 11, further comprising, prior to applying the braze material, cleaning the repair surface.

13. The method of claim 11, wherein the second set of particles has a bimodal particle size distribution.

14. The method of claim 11, wherein the first set of particles defines a median particle diameter between about 25 μm and about 40 μm.

15. The method of claim 11, wherein the braze material further comprises an additive comprising at least one of C, Si metal, a silicide, or a carbide.

16. The method of claim 11, wherein the Si-containing alloy comprises at least one of a Si—Ti alloy, a Si—Al—Ti alloy, a Si—Co—V—Ti alloy, or a Si—Ti—Ni—Co—Cr alloy.

17. The method of claim 11, wherein each particle size distribution of the multimodal particle size distribution of the second set of particles defines a median particle size between about 0.3 μm and about 45 μm.

18. The braze material of claim 11, wherein the braze material of the repaired article comprises between about 20 weight % and about 60 weight % of SiC.

19. The method of claim 11, wherein the first set of particles and the second set of particles are each substantially evenly distributed throughout the braze material.

20. An assembly comprising:
   a ceramic matrix composite component defining a repair surface; and
   a braze material on the repair surface, wherein the braze material comprises:
      a first set of particles comprising a braze powder, wherein the braze powder comprises an Si-containing alloy, and wherein the first set of particles defines a median particle diameter between about 1 μm and about 40 μm;
      a second set of particles comprising at least one of SiC or a transition metal carbide, wherein the second set of particles has a multimodal particle size distribution; and
      a polymeric binder.

* * * * *